US007459081B2

(12) United States Patent
Koenig et al.

(10) Patent No.: US 7,459,081 B2
(45) Date of Patent: Dec. 2, 2008

(54) CONTACTING SYSTEMS AND METHODS AND USES THEREOF

(75) Inventors: Donald Koenig, San Diego, CA (US); Santosh Limaye, El Cajon, CA (US)

(73) Assignee: Phyre Technologies, Inc., El Cajon, CA (US)

( * ) Notice: Subject to any disclaimer, the term of this patent is extended or adjusted under 35 U.S.C. 154(b) by 291 days.

(21) Appl. No.: 11/001,701

(22) Filed: Nov. 30, 2004

(65) Prior Publication Data

US 2006/0113248 A1 Jun. 1, 2006

(51) Int. Cl.
*B01D 63/00* (2006.01)
*B01D 53/00* (2006.01)
*B01D 53/22* (2006.01)
*B01D 61/00* (2006.01)

(52) U.S. Cl. ............... 210/321.61; 210/304; 166/305.1; 261/122.1; 95/46; 95/54; 96/6; 96/8; 96/11

(58) Field of Classification Search ....................... None
See application file for complete search history.

(56) References Cited

U.S. PATENT DOCUMENTS 4,268,279 A 5/1981 Shindo et al.
4,539,113 A 9/1985 Tomita et al.
4,729,773 A 3/1988 Shirato et al.
4,740,219 A 4/1988 Kulprathipanja et al.
4,869,732 A 9/1989 Kalfoglou
5,078,755 A 1/1992 Tozawa et al.
5,522,917 A * 6/1996 Honda et al. .................. 95/46
5,723,035 A 3/1998 Mazanec et al.
5,762,684 A 6/1998 Hayashi et al.
5,830,261 A 11/1998 Hamasaki et al.
5,858,283 A * 1/1999 Burris ..................... 261/122.1
5,863,031 A * 1/1999 Veeder et al. ............ 261/122.1
5,888,275 A 3/1999 Hamasaki et al.
5,968,366 A 10/1999 Deckman et al.
6,053,249 A * 4/2000 Stevenson et al. ........ 166/305.1
6,168,648 B1 1/2001 Ootani et al.
6,303,384 B1 10/2001 Mills et al.
6,315,815 B1 11/2001 Spadaccini et al.
6,431,528 B1 * 8/2002 Kojima ...................... 261/79.2

* cited by examiner

*Primary Examiner*—Krishnan S Menon
(74) *Attorney, Agent, or Firm*—Foley & Lardner LLP; Stephen E. Reiter

(57) ABSTRACT

The present invention provides systems and methods for facilitating contact between a liquid and a fluid. Such systems and methods may allow efficient removal of components from the liquid without using undesirable reducing agents. In this regard, the disclosed embodiments provide for the purification of a liquid by passing the liquid and a fluid through a porous medium. The porous medium facilitates mixing of the liquid and the fluid. A partial pressure differential of the component between the liquid and the fluid facilitates the transfer of the component from the liquid to the fluid in the mixed liquid and fluid. One embodiment of the invention relates to a method of purifying a liquid. The method includes passing a liquid, such as a fuel, and a fluid, such as a non-reactive gas, through a porous medium, the liquid containing a component, such as oxygen gas, therein. The passing causes mixing of the liquid and the fluid and transfer of at least some of the component from the liquid to the fluid. The method also includes separating the liquid and the fluid, the separated fluid including at least some of the component.

14 Claims, 14 Drawing Sheets

CONTACTING SYSTEMS AND METHODS AND USES THEREOF

This invention was made with Government support under government contract no. FA8650-04-C-2457 awarded by the U.S. Department of Defense to Phyre Technologies, Inc. The Government has certain rights in the invention, including a paid-up license and the right, in limited circumstances, to require the owner of any patent issuing in this invention to license others on reasonable terms.

BACKGROUND OF THE INVENTION

The present invention relates generally to the field of contacting systems and methods. In particular, the invention relates to systems and methods of contacting two or more fluids and uses thereof, such as removing contaminants from or adding supplements to liquids, such as fuels.

Removal of a material from or addition of a material to a liquid can be useful in many applications. For example, adding a gas to a liquid is required for the production of carbonated beverages. Removal of a gas from a liquid may be desirable to produce a purified liquid, for example. Purified liquids are desirable in many applications. In particular, removal of contaminants from a liquid may be required in many industrial and commercial applications. For example, in the case of fuels, such as diesel or jet fuels, impurities in the fuel can result in high maintenance costs and poor performance. For example, the presence of oxygen in fuels can result in poor performance of a machine using the fuel, such as a jet engine. Further, oxygen-saturated fuels can inhibit a coolant or heat-sink function served by fuels when the oxygen-saturated fuel causes coking, thereby restricting fuel flow.

Conventional methods of removing contaminants, such as oxygen, from liquids, such as fuels, have considerable drawbacks. For example, use of reducing agents to chemically bind the oxygen results in further contamination issues related to the active metals which may be used. Further, the large volume and weight of such systems prohibits their use on aircraft in-flight purification systems. Accordingly, there is a need for improved systems and methods of purifying liquids while eliminating such drawbacks.

SUMMARY OF THE INVENTION

The present invention provides systems and methods for purifying or infusing a liquid which allow efficient and/or uniform addition of components to or removal of components from the liquid. The components may be undesirable components to be removed from a liquid or a desired component or components to be added to the liquid, for example, each of which is referred to herein as "component.". In this regard, the disclosed embodiments provide for the purification or infusion of a liquid by passing the liquid and a fluid through a porous medium. The porous medium facilitates mixing of the liquid and the fluid. A differential of partial pressure, activity, fugacity or concentration of the components between the liquid and the fluid facilitates the transfer of the components between the liquid and the fluid in the mixed liquid and fluid.

One embodiment of the invention relates to a method of transferring a component between a liquid and a fluid. The method includes passing a liquid, such as a fuel, and a fluid, such as a gas, through a porous medium, at least one of the liquid and the fluid containing a component, such as oxygen gas, therein. Within the porous medium, the liquid and the fluid mixture has a component partial pressure differential. The passing causes mixing of the liquid and the fluid and transfer of at least some of the component between the liquid and the fluid. The method may also include, separating the liquid and the fluid after the transfer of the component.

In another embodiment, the invention includes a system for transferring a component between a liquid and a fluid. The system includes a porous medium adapted to cause mixing of a liquid and a fluid and transfer of at least some of a component between the liquid and the fluid, and a separator for separating the liquid and the fluid.

In another embodiment, the invention includes a porous medium for facilitating mixing of a liquid and a fluid. The porous medium includes a porous body and pores being adapted to cause surface mixing of a fluid flowing therethrough with a liquid having a component flowing therethrough. In a particular embodiment, the pores have sufficiently small pore sizes and sufficiently complex shape to cause surface mixing.

In another embodiment, the invention includes a mixing body adapted to mix a liquid and a fluid. The mixing body includes a plurality of axial channels for passing a liquid therethrough into a path substantially aligned with the axial channels. The mixing body also includes a porous body for diffusing a fluid into the path.

DETAILED DESCRIPTION OF THE PREFERRED EMBODIMENTS

Figure 1A:
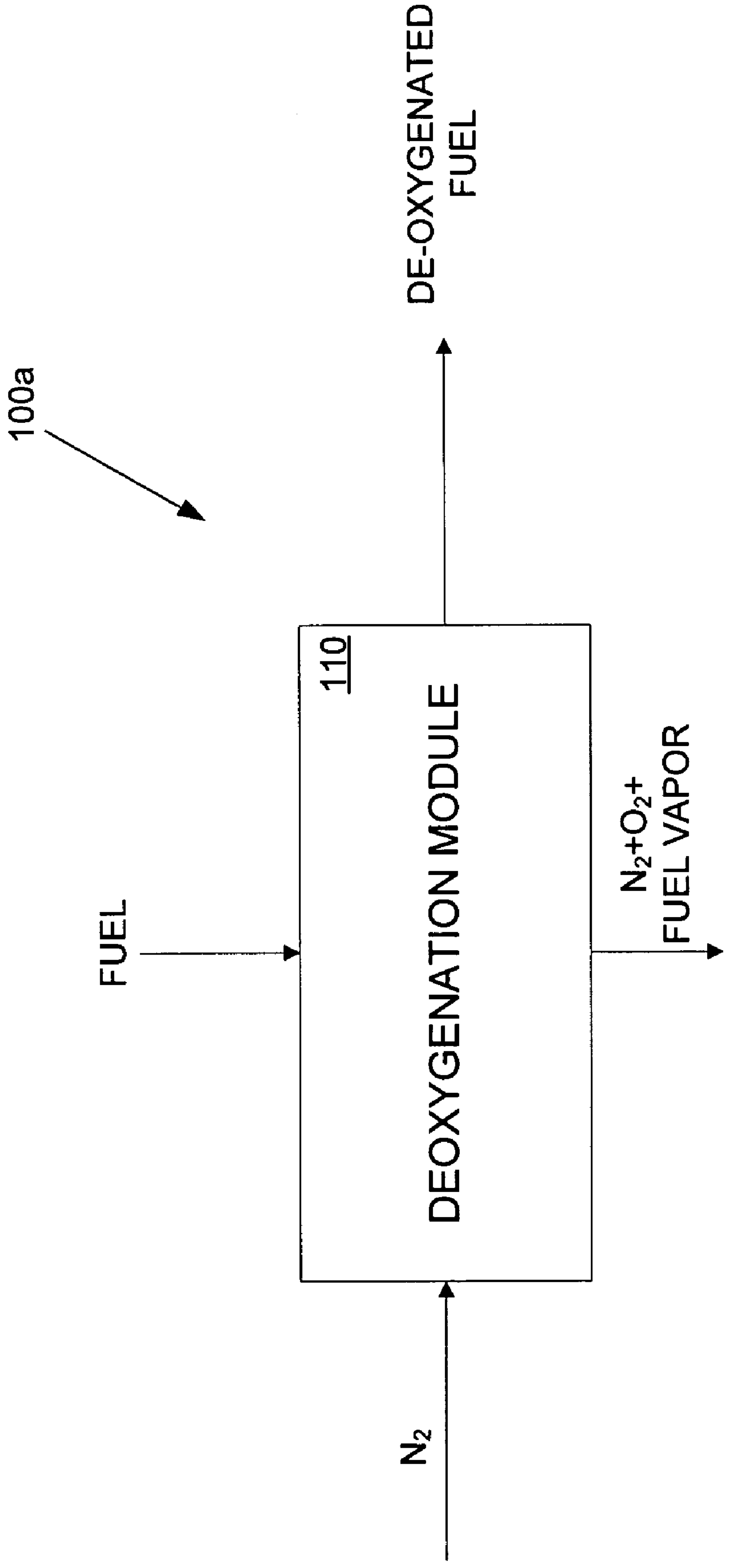
FIG. 1A is a schematic illustration of one embodiment of a purification system according to the invention.

One embodiment of the invention includes a system for transferring a component between a liquid and a fluid. The system includes a porous medium adapted to cause mixing of a liquid and a fluid, at least one of the liquid and the fluid having a component therein. The porous medium is further adapted to cause transfer of at least some of the component from the liquid to the fluid. The system may also include a separator for separating the liquid and the fluid.

A "component" may be mixed, absorbed, suspended or dissolved in the liquid or the fluid.

"Fluid" may be a liquid, a gas or a material in any phase which allows the material to flow readily.

In one embodiment, the system also includes a fluid purification module adapted to remove the component from the fluid. In a particular embodiment, the fluid purification module includes a pressure swing adsorption module. In other embodiments, the purification module may include membranes. A recirculation line may be provided to transfer the fluid from the fluid purification module to the porous medium.

As used herein, "purification" and "purifying" refer to the removal from a fluid of one or more components. The removal may be partial, complete or to a desired level and may include removal of only some or all components.

In one embodiment, the system may also include a recirculation line adapted to transfer the fluid from the separator to the porous medium.

In one embodiment, the system also includes a vapor trap adapted to separate vaporized liquid mixed with the fluid from the separator.

In a particular embodiment, the porous medium includes pores having a pore size of less than 500 microns. In a further particular embodiment, the pore size is between about 350 and about 450 microns. In a still further embodiment, the pore size is approximately 400 microns.

In one embodiment, the system also includes a pre-mixer adapted to provide a mixture of the fluid and the liquid to the porous medium. In a particular embodiment, the pre-mixer includes a plurality of axial channels for passing the liquid therethrough into an axial path directed toward the porous medium and a porous body for diffusing the fluid into the axial path. The pre-mixer may also include an annular passage along a circumferential perimeter of the pre-mixer for receiving the fluid and directing the fluid to the porous body.

The porous medium may be made of an inert material, such as metals, ceramics, plastic, glass or other organic or inorganic solid materials.

In one embodiment, the separator includes at least one centrifugal separator.

In a particular embodiment, the liquid is a fuel and the component is a gas. The fuel may be diesel, kerosene or jet fuel, for example. The gas may be oxygen.

In a particular embodiment, the component is a gas that is dissolved in the liquid prior to passing the liquid and the fluid through the porous medium.

In one embodiment, the fluid is a gas. In a particular embodiment, the gas is a non-reactive gas under operating conditions, such as nitrogen, argon, helium or carbon dioxide, that is substantially free of the component. In other embodiments, the gas may be a noble gas.

Another embodiment of the invention includes a method of transferring a component between a liquid and a fluid. The method includes passing a liquid and a fluid through a porous medium, at least one of the liquid and the fluid containing a component therein, the passing causing mixing of the liquid and the fluid and transfer of at least some of the component between the liquid and the fluid. The method may further include separating the liquid and the fluid, at least one of the separated fluid and the separated liquid including at least some of the component.

In a particular embodiment, the method also includes removing the component from the fluid if the component has been transferred from the liquid to the fluid. Removing the component may include pressure swing adsorption. In a further particular embodiment, the purified fluid may be recirculated for use in any continuation of passing the fluid through the porous medium.

In a particular embodiment, the method also includes recovering any vaporized liquid mixed with the fluid after separation of the fluid from the liquid.

In one embodiment, the method also includes passing the liquid and the fluid through a pre-mixer before passing through the porous medium. In a particular embodiment, the pre-mixer includes a plurality of axial channels for passing the liquid therethrough into an axial path directed toward the porous medium and a porous body for diffusing the fluid into the axial path. The pre-mixer may further include an annular passage along a circumferential perimeter of the pre-mixer for receiving the fluid and directing the fluid to the porous body.

In one embodiment, separating the liquid and the fluid includes passing the fluid and the liquid through at least one centrifugal separator.

Another embodiment of the invention includes a porous medium for facilitating mixing of a liquid and a fluid. The porous medium includes a porous body and pores formed in the porous body. The pores are adapted to cause surface mixing of a fluid with a liquid having a component flowing through the porous body. The pores have pore sizes sufficiently small and pore shapes sufficiently complex to cause surface mixing.

Still another embodiment of the invention includes a method of purifying a liquid. The method includes passing a liquid and a fluid through a porous medium, the liquid containing a component therein, the passing causing mixing of the liquid and the fluid and transfer of at least some of the component from the liquid to the fluid. The method also includes separating the liquid and the fluid, the separated fluid including at least some of the component, and removing the component from the fluid. The fluid with the component removed is recirculated for use in any continuation of passing the liquid and fluid through the porous medium.

Another embodiment of the invention includes a mixing body adapted to mix a liquid and a fluid. The mixing body includes a plurality of axial channels for passing a liquid therethrough into a path substantially aligned with the axial channels and a porous body for diffusing a fluid into the path. In a particular embodiment, the mixing body also includes an annular passage along a circumferential perimeter of the porous body for receiving the fluid and directing the fluid to the porous body.

In this regard, "a path substantially aligned with the axial channels" refers to the general direction of flow. The path may include a conical or radial component. For example, in certain regions, the path may include only a radial component which transitions or diffuses into an axial flow.

Referring to FIG. 1A, an exemplary system for transferring a component, such as a contaminant, between a liquid and a fluid is schematically illustrated. In the illustrated example, the component is contained in a liquid to be purified. Of course, in other embodiments, the component may be contained in the fluid or the fluid itself. In the example of FIG. 1A, the liquid to be purified is a fuel having a component, such as gaseous oxygen, absorbed therein. In other embodiments, other liquids with a variety of components may be purified.

The system 100*a* includes a purification module, such as a deoxygenation module 110, which is described in greater detail below. The deoxygenation module 110 is adapted to receive a liquid fuel and gaseous nitrogen. The liquid fuel may have a component, such as gaseous oxygen, absorbed therein. The gaseous nitrogen is preferably substantially oxygen-free. The operation of the deoxygenation module 110 causes the gaseous oxygen to be transferred from the fuel to the nitrogen. Thus, the outputs of the deoxygenation module 110 in the system 100*a* are de-oxygenated fuel and gaseous nitrogen with oxygen absorbed therein. A limited amount of fuel vapor may be output with the nitrogen/oxygen stream.

Figure 1B:
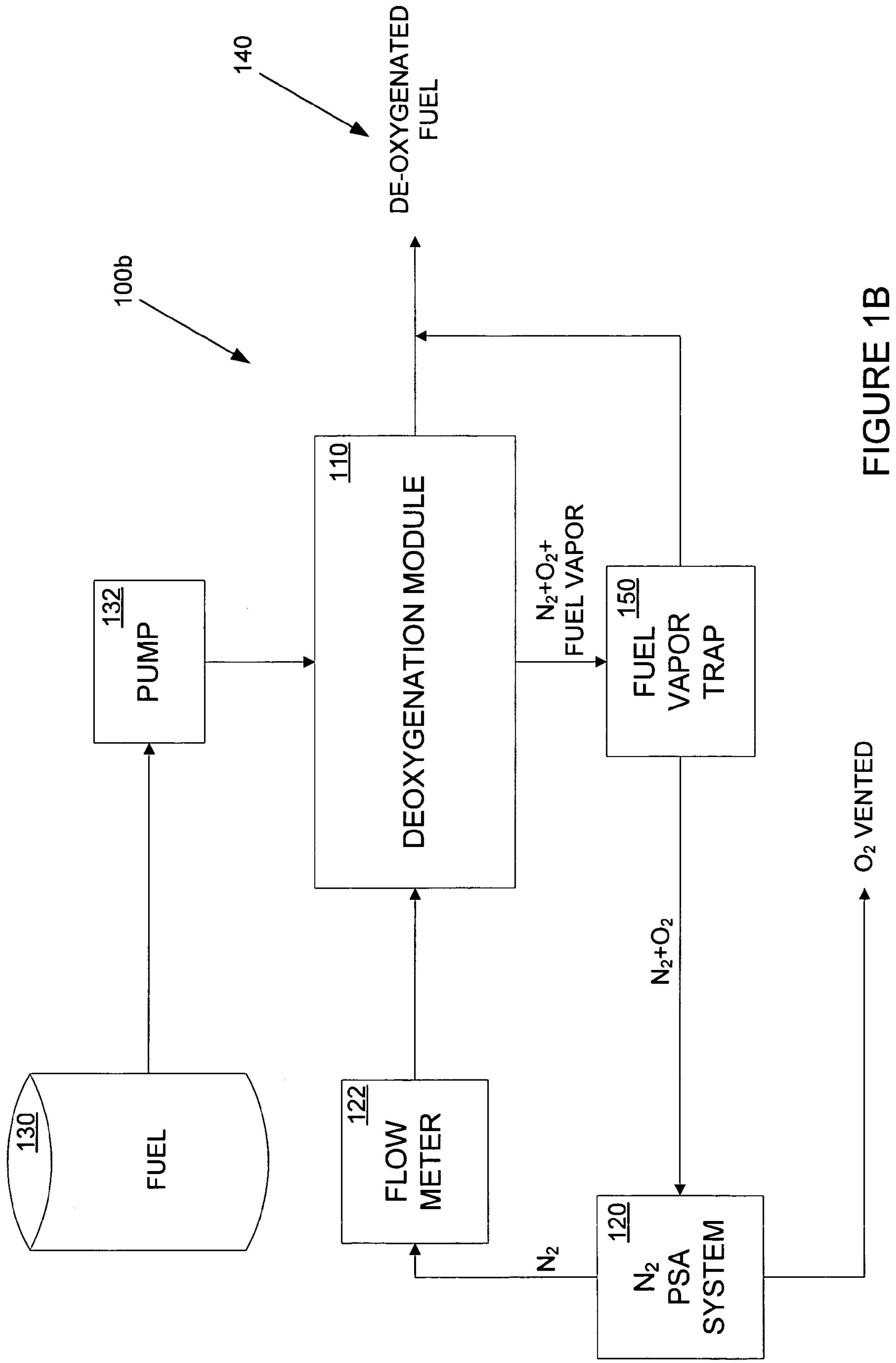
FIG. 1B is a schematic illustration of another embodiment of a purification system according to the invention.

Referring now to FIG. 1B, a second embodiment of a purification system is illustrated. In the system 100*b*, the deoxygenation module 110 is adapted to receive fuel from a reservoir such as a fuel tank 130. The flow of fuel into the deoxygenation module 110 may be facilitated by a pump 132 positioned between the fuel tank 130 and the deoxygenation module 110. The fuel tank 130, the pump 132 and the deoxygenation module 110 are connected using tubes, pipes or lines, for example. The size of the fuel tank 130 and the capacity of the pump 132 may be determined according to particular applications and requirements. In one embodiment, the deoxygenation module 110 is adapted to receive and process fuel at the rate of 2 U.S. gallons per minute.

The deoxygenation module 110 is also adapted to receive a supply of a fluid, such as a gas, to mix with the fuel. In certain embodiments, the fluid is a non-reactive gas, such as nitrogen, argon, or the like. In the illustrated example, the fluid is nitrogen gas. The nitrogen may be received from a pressurized nitrogen bottle. In other embodiments, the nitrogen is received from a fluid purification module, such as a highly optimized pressure swing adsorption (PSA) system 120, which supplies substantially oxygen-free nitrogen (e.g., 99.9% $N_2$). The flow of nitrogen into the deoxygenation module 110 may be regulated using a flow meter 122, for example. In one embodiment, the deoxygenation module 110 is adapted to receive nitrogen and fuel at a rate based on the desired fuel output. For example, the large fluid-to-fuel ratio may be used to obtain a more purified fuel while a smaller fluid-to-fuel ratio may be used to obtain a less purified fuel. In particular embodiments, the fluid-to-fuel ratio may be 10:1, 4:1, 2:1, 1:1, 1:2, 1:4, or 1:10.

The deoxygenation module 110 is adapted to transfer the component, such as oxygen gas, from the fuel to the nitrogen gas. This aspect of the deoxygenation module is described in greater detail below with reference to FIGS. 2-7C. Thus, the output of the deoxygenation module 110 includes a stream of de-oxygenated fuel 140 and a separate stream of nitrogen gas with oxygen.

In many cases, certain amounts of the liquid fuel may evaporate either in the deoxygenation module 110 or prior to entering the deoxygenation module 110. In this regard, the system 100*b* includes a fuel vapor recovery module 150 through which the nitrogen stream is processed. The fuel vapor recovery module 150 may be a vapor trap including a coalescing filter adapted to separate the fuel vapor from the nitrogen stream, producing condensed fuel. The condensed fuel is then routed to the fuel stream 140 exiting the deoxygenation module 110, as shown in FIG. 1. In other embodiments, in order to maintain the deoxygenated level of the fuel 140 from the deoxygenation module 110, the recovered fuel vapor may be routed to the fuel tank 130.

The stream of nitrogen with oxygen from the fuel vapor recovery module 150 can then be directed to the PSA system 120, which separates the oxygen from the nitrogen. The purified nitrogen can then be used for deoxygenation of additional fuel, while the oxygen can be vented to the atmosphere. In cases where the system 100*b* is operating in a closed environment, such as a laboratory or an operational application in a closed area, the stream of nitrogen and oxygen may be further treated prior to being directed to the PSA system 120. The stream of nitrogen and oxygen may be similarly treated in systems without a PSA system. For example, the stream of nitrogen and oxygen may be treated through an active carbon filter to remove components prior to either PSA processing or venting to the atmosphere. In other embodiments, the active carbon filter may be positioned upstream of the PSA system 120. Thus, the components may be removed from the nitrogen as well.

Figure 1C:
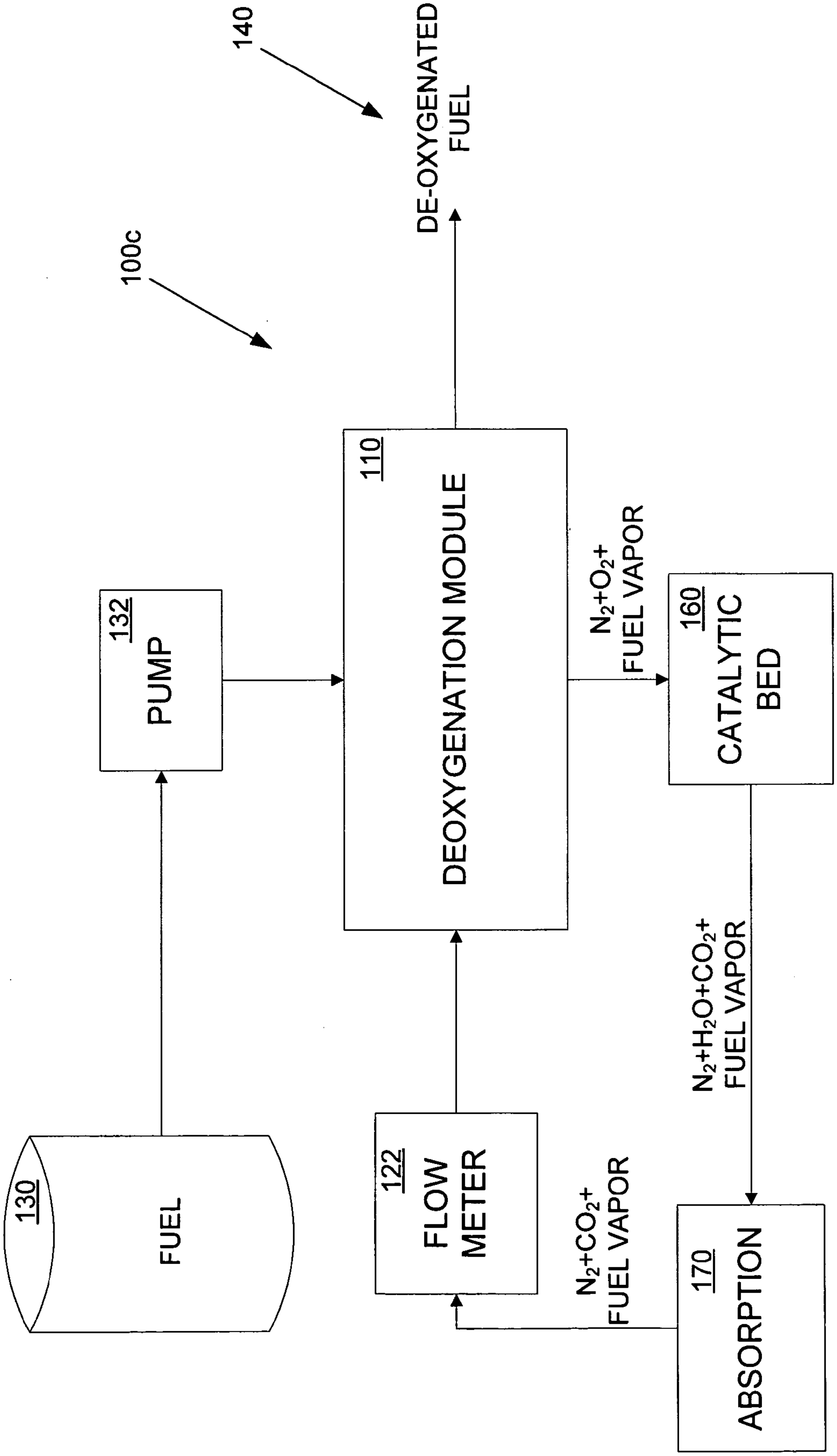
FIG. 1C is a schematic illustration of still another embodiment of a purification system according to the invention.

FIG. 1C illustrates still another embodiment of a purification system. In the system 100*c*, the stream of nitrogen, oxygen and fuel vapor is directed through a catalytic bed 160. The catalytic bed 160 is adapted to cause a reaction between the fuel vapor and the oxygen molecules to produce carbon dioxide and water. Thus, the output of the catalytic bed 160 is a mixture of nitrogen, water, carbon dioxide and any remaining fuel vapor. This mixture is then directed to an adsorption module 170. The adsorption module 170 is adapted to absorb water, either liquid or vapor, from the stream. The water from the stream may be either retained within the adsorption module 170 or otherwise directed out of the stream. Thus, oxygen is effectively removed from the stream, while carbon dioxide is added. The carbon dioxide can continue to function as an oxygen-free fluid, in addition to the nitrogen, in the transfer of oxygen from the fuel.

Figure 2:
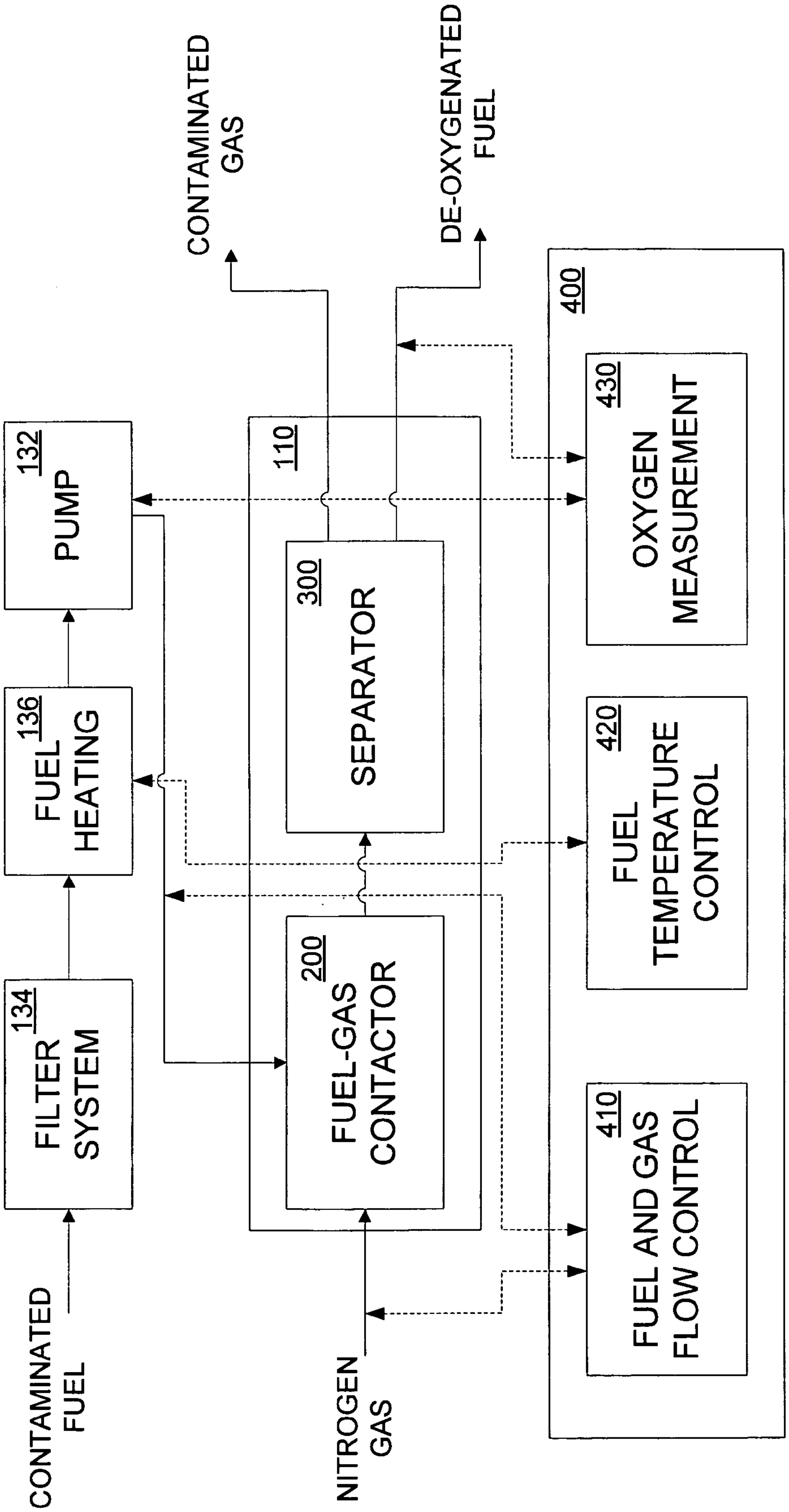
FIG. 2 is another schematic illustration of the purification system shown in FIG. 1.

The exemplary purification system 100 is illustrated in further detail in FIG. 2. The system 100, in certain embodiments, includes pre-treatment of the fuel and control modules for controlling various aspects of the system 100. The pre-treatment of the fuel may include processing the fuel through a filter system 134 to remove certain components, such as solid particles, to prevent such components from affecting the operation of the deoxygenation module 110. Such filter systems are well known to those skilled in the art.

Further, a fuel thermal regulator 136 may be provided to control the temperature of the fuel. The temperature may require regulation based on the requirements of the machine for which the fuel is deoxygenated. The fuel thermal regulator 136 may include a heater for increasing the fuel temperature and/or a heat exchanger for increasing or decreasing the fuel temperature. In certain embodiments, the temperature of the fuel may be increased to facilitate removal of a component.

The control system 400 includes control modules for controlling the various modules of the system 100. A flow control module 410 is provided to control the flow rates of the fuel and the nitrogen gas. In this regard, the flow control module 410 may be adapted to communicate with and control the flow meter 122 and the pump 132 described above and shown in FIG. 1. Similarly, a temperature control module 420 is provided to communicate with and control the fuel thermal regulator 136 for regulating the temperature of the fuel. Finally, an oxygen measurement module 430 may be provided to monitor the operation of the deoxygenation module 110. In this regard, sensors (not shown) may be provided at the input and output of the deoxygenation module 110. The sensors may communicate data to the oxygen measurement module 430 to determine the level of deoxygenation being achieved. In some embodiments, the oxygen measurement module 430 may be adapted to transmit a message to an operator indicating a malfunction of the deoxygenation module 110.

As illustrated in FIG. 2, the deoxygenation module 110 includes a fuel-gas contactor 200 and a gas-fuel separator 300. Each of these components is described below in greater detail.

Figure 3:
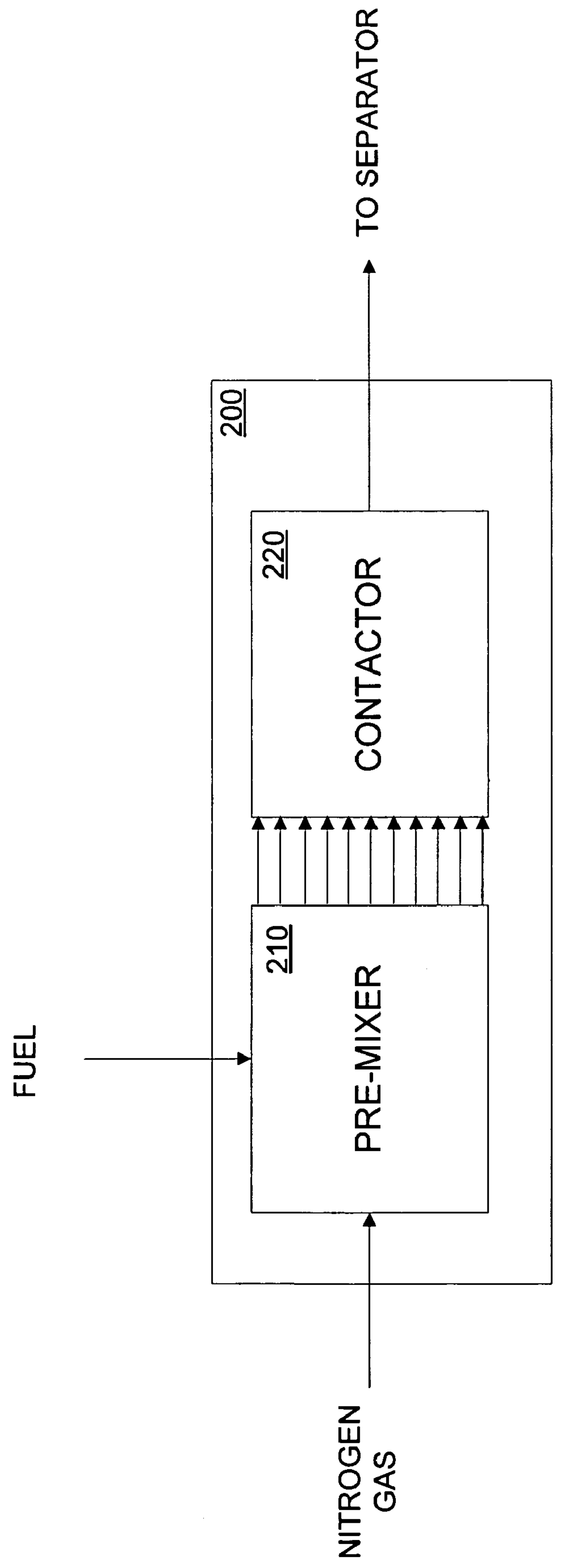
FIG. 3 is a schematic illustration of the contactor module shown in FIG. 2.

FIG. 3 is a schematic illustration of an embodiment of the fuel-gas contactor 200 of the deoxygenation module 110 shown in FIG. 2. In this embodiment, the fuel-gas contactor 200 includes a pre-mixer 210 for mixing the input streams of fuel and nitrogen. The pre-mixer 210 facilitates the uniform mixing of the two streams to facilitate deoxygenation of the fuel. An embodiment of the pre-mixer 210 is described in greater detail below with reference to FIGS. 4A, 4B and 5. The mixture output by the pre-mixer 210 is directed to a contactor 220 for facilitating surface mixing of the fuel and nitrogen, as described in detail below with reference to 6A-7C. The output of the contactor 220 is directed out of the fuel-gas contactor 200 and to the separator 300 (FIG. 2).

Figure 4A:
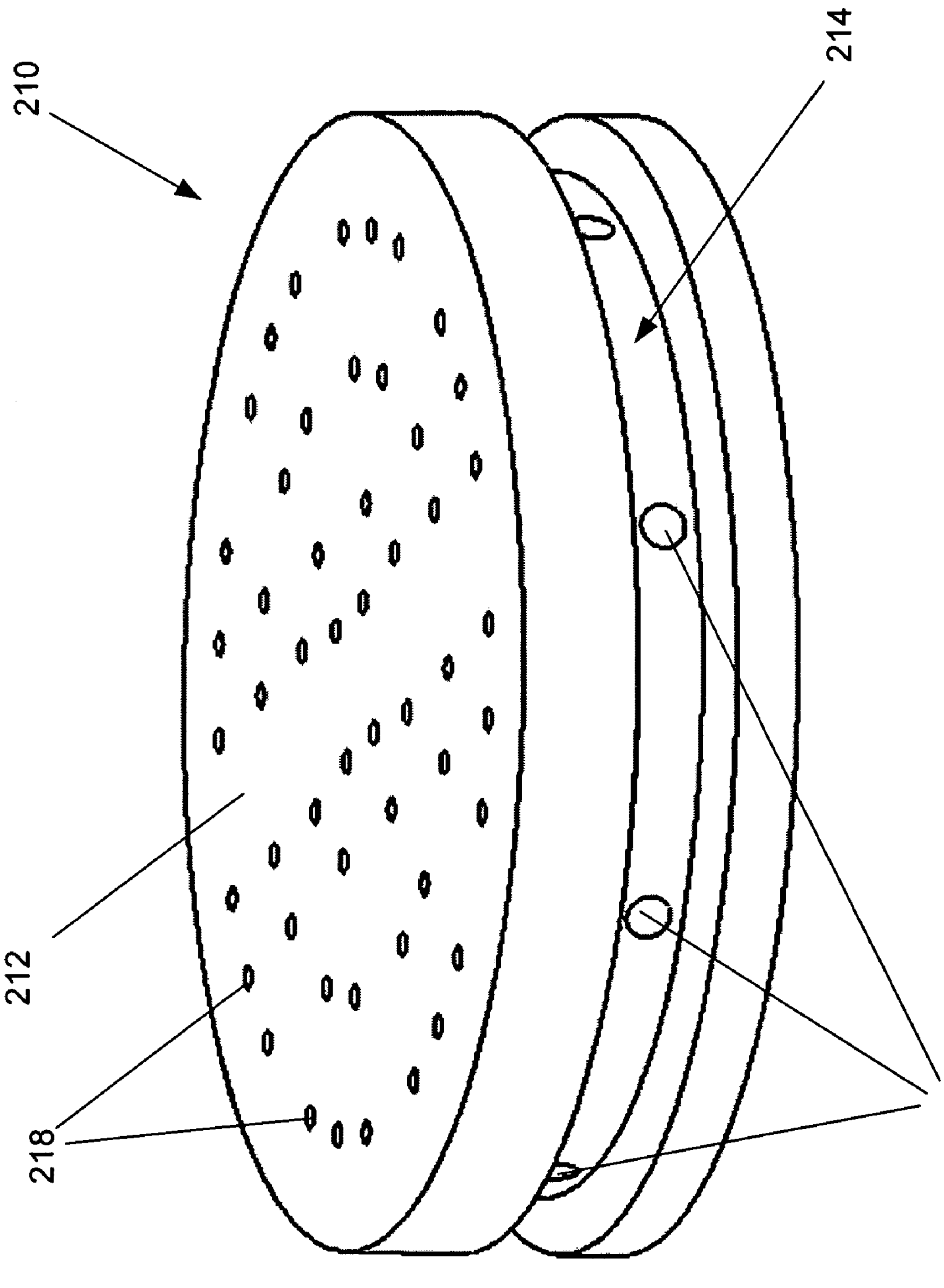
FIG. 4A is an illustration of a mixer body according to an embodiment of the invention.
Figure 4B:
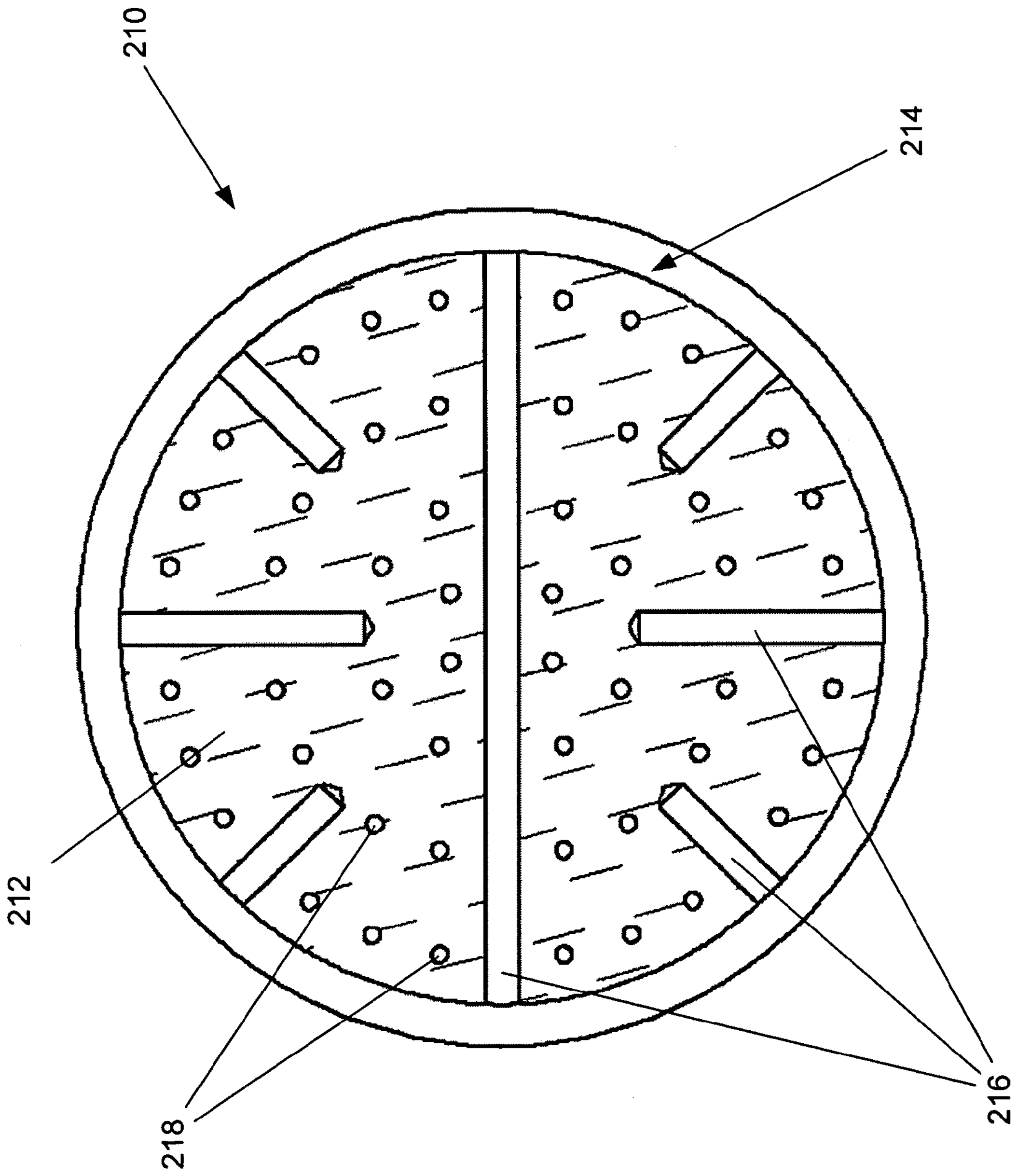
FIG. 4B is a cross-sectional view of the mixer body shown in FIG. 4A.

An embodiment of a pre-mixer 210 will now be described with reference to FIGS. 4A and 4B. The pre-mixer 210 is provided to mix the liquid fuel and the gaseous nitrogen immediately before the contactor processing described below. Even distribution of the fuel and gas allows the contactor to operate more efficiently with less gradients or channeling across or through the contactor. Further, such distribution allows the contactor to operate without being substantially affected by changes in orientation relative to gravitational forces.

The illustrated embodiment of the pre-mixer 210 includes a porous body 212 which allows the nitrogen gas to deliver a relatively even discharge adjacent to the contactor. An annular channel 214 is provided to receive the nitrogen gas from, for example, the PSA system, and distribute the gas across the cross-section of the porous body 212 through a set of non-axial channels 216. The non-axial channels 216 guide the gas from the annular channel 214 into various sections of the porous body 212 for diffusion through the porous body along an axial path.

Axial channels 218 are provided through the pre-mixer 210 and are substantially evenly distributed, avoiding any non-axial gas channels 216. The axial channels 218 allow the liquid fuel to pass through the pre-mixer 210. In a particular embodiment, a large number of axial channels 218 are provided to facilitate even distribution of the fuel. In one embodiment, the size of the axial channels 218 is sufficiently large so a particulate will not block passage of the liquid fuel with minimal back pressure.

The porous body 212 of the pre-mixer 210 is preferably made from a porous material with channels for the liquid, as described above. In other embodiments, the pre-mixer can be made from a solid piece or multi piece assembly of solid materials. In this regard, the pre-mixer may include channels for the liquid as well as channels for the fluid. The channels for the fluid may be substantially smaller than the channels for the liquid. However, the cost to manufacture a pre-mixer with solid materials can be substantially higher compared to the cost of using porous materials.

Porosity of the pre-mixer can be chosen with certain basic parameters satisfied. For example, the gas used in the process (e.g., nitrogen gas) should flow through the porous body 212 with minimal flow restriction, such as approximately 1%-6% pressure drop under operating conditions. Further, the liquid being processed (e.g., liquid fuel) may pass through the porous material under pressure closely above operating liquid pressure. The porous material should be chemically compatible or resistant to the fluid and liquid being processed.

The porous body may be designed to accommodate various flow patterns for the liquid. For example, in one embodiment, the flow of the liquid may be substantially axial and linear. In other embodiments, the flow may be non-linear through the porous body. Still in other embodiments, the flow may be substantially radial in certain regions.

Figure 5:
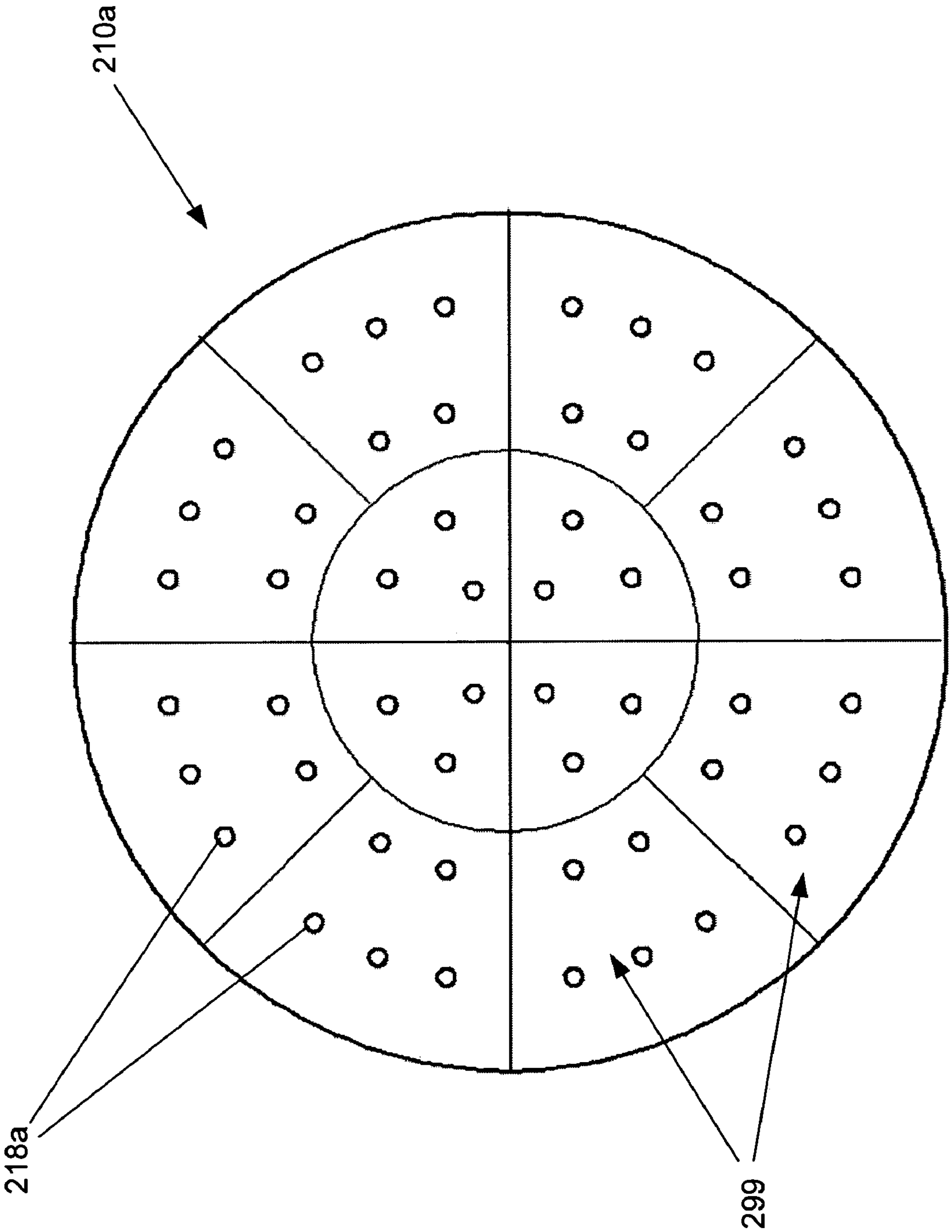
FIG. 5 is a top view of another embodiment of a mixer body according to the invention.

A small distance may be provided between the pre-mixer 210 and the contactor 220 to allow the pressure across the contactor to equalize. In one embodiment, this distance is approximately 0.25 to 1.25 mm. In another embodiment, direct mating of the pre-mixer 210*a* and the contactor 220 may be facilitated by providing a subsectioned pre-mixer, as illustrated in FIG. 5. In this embodiment, indented regions 299 may be formed on the face of the pre-mixer 210*a* to sectionalize flow to the contactor 220 in order to reduce the effects of orientation and external forces causing inconsistent process output. In this regard, the face of the contactor facing the pre-mixer 210*a* may be provided with similar indented regions 299. If sectionalized flow paths are used, axial channels 218*a* of the pre-mixer 210*a* should connect to a sectionalized flow compartment of the contactor 220.

It is noted that the fuel-gas contactor 200 may operate without the pre-mixer. The pre-mixer is provided to reduce the effects of orientation and external forces upon the fuel-gas contactor 200.

Figure 6A:
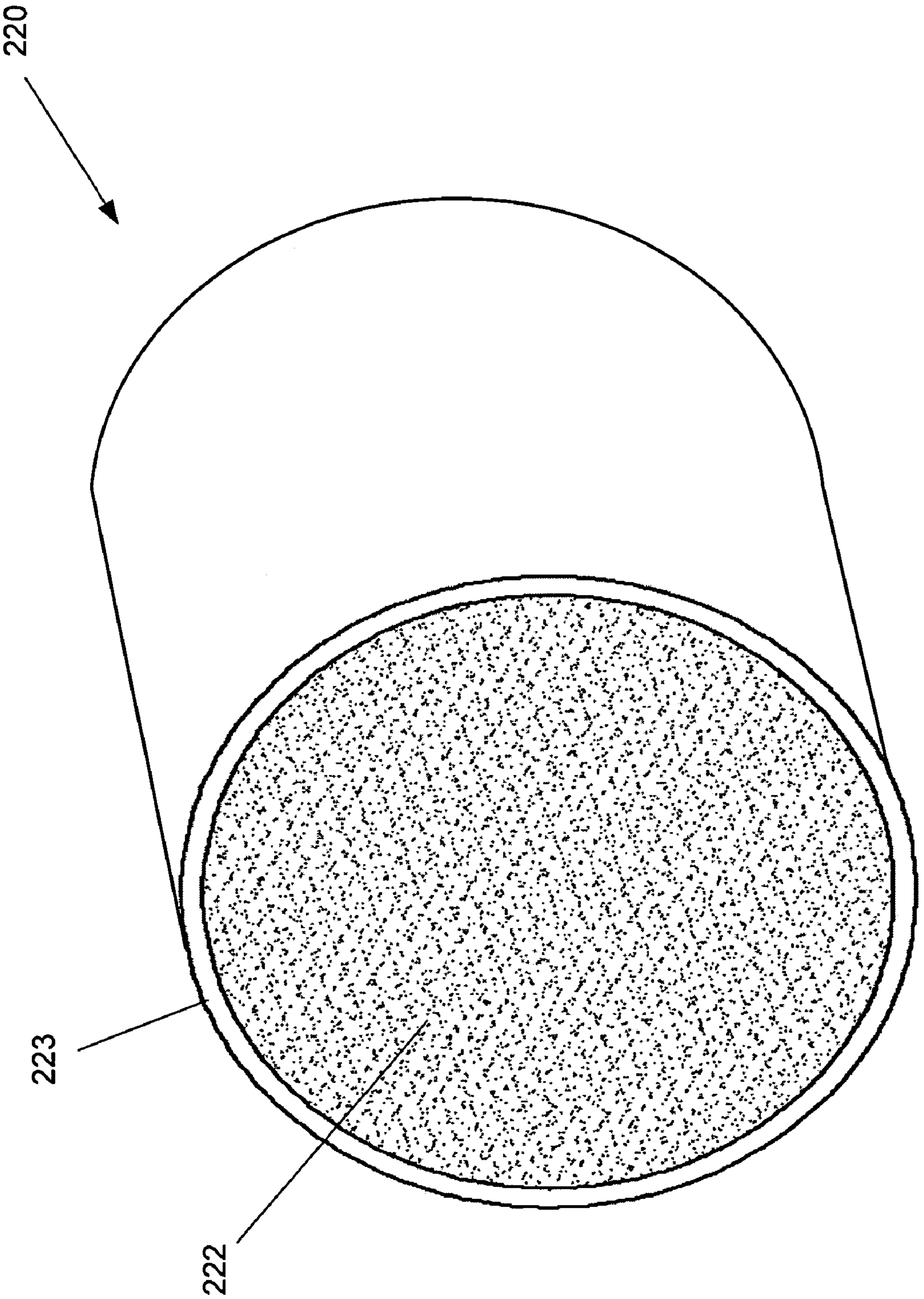
FIG. 6A is an illustration of an embodiment of a contactor according to the invention.

An embodiments of the contactor 220 will now be described with reference to FIG. 6A. The contactor 220 is a porous medium having a porous body 222. The porous body 222 of the contactor 220 is adapted to facilitate surface mixing of the liquid fuel and the nitrogen gas, thereby allowing efficient transfer of the oxygen from the fuel to the nitrogen. In this regard, the porous body 222 is provided with a fine porosity, the pores being small enough to cause surface mixing of the nitrogen gas with the liquid fuel. In one embodiment, the pores have an average pore size of up to 500 microns (e.g., 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490 or 500 microns). In this regard, a single porous body may include pores of varying sizes. In a particular embodiment, the pore size in the porous body 222 is between 350 and 450 microns and, in a more particular embodiment, approximately 400 microns. The pore sizes are selected to be sufficiently small to cause surface mixing of the fluid and the liquid, while allowing the fluid and liquid to flow therethrough. In this regard, the size of the pores may be determined by the viscosity of the fluid and the liquid. An impervious casing 223 may be provided to prevent seepage of the liquid and the fluid.

Figure 6B:
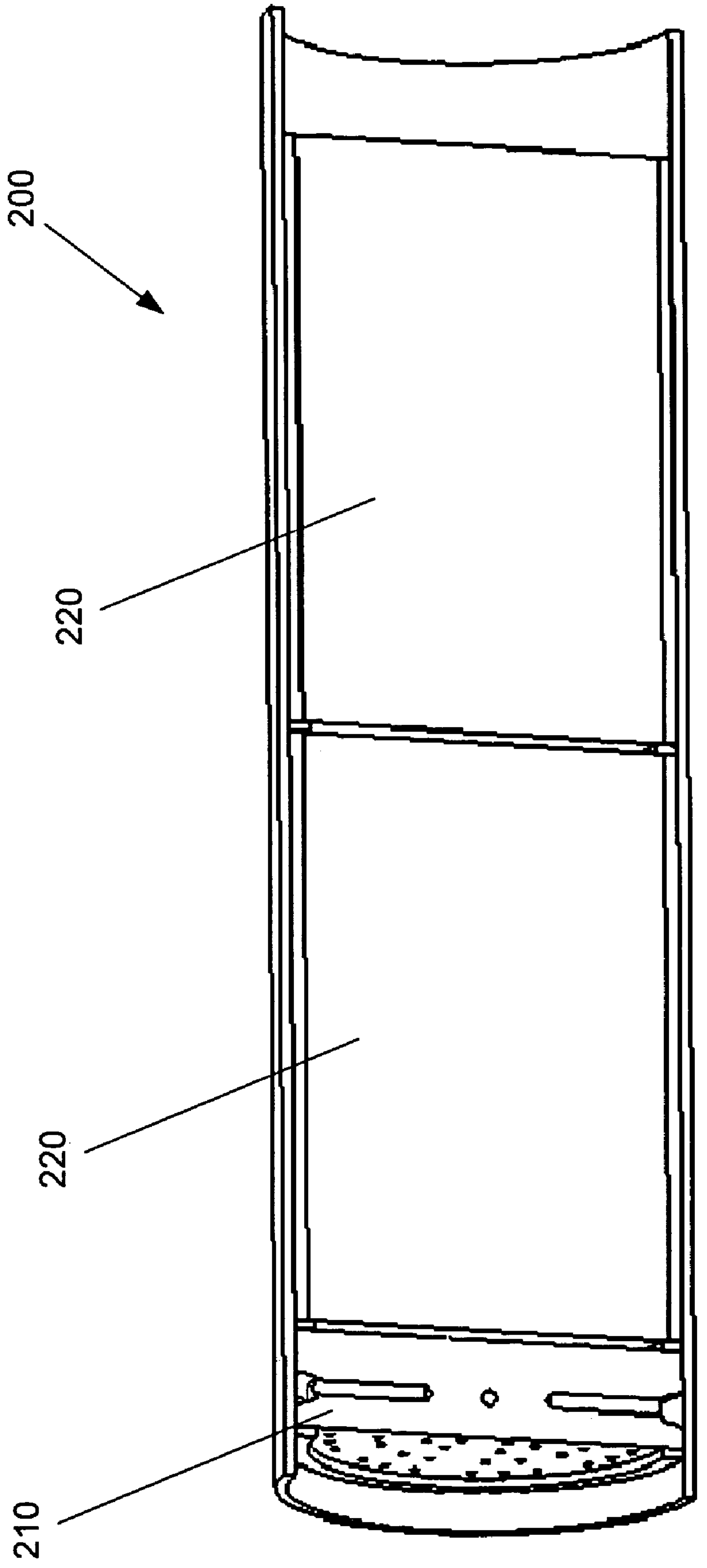
FIG. 6B is an illustration of an embodiment of a contactor module according to the invention.

FIG. 6B illustrates an embodiment of a contactor module 200 according to the invention. As illustrated in FIG. 6B, the fuel-nitrogen mixture may be processed through multiple contactors 220. Each contactor 220 may result in transfer of oxygen from the fuel to the nitrogen gas. The number of contactors 220 may be dependent on the level of deoxygenation required by the machine using the fuel. Further, the nitrogen gas may be processed to remove the oxygen between the contactors 220 to enhance the deoxygenation process at each contactor 220.

Figure 6C:
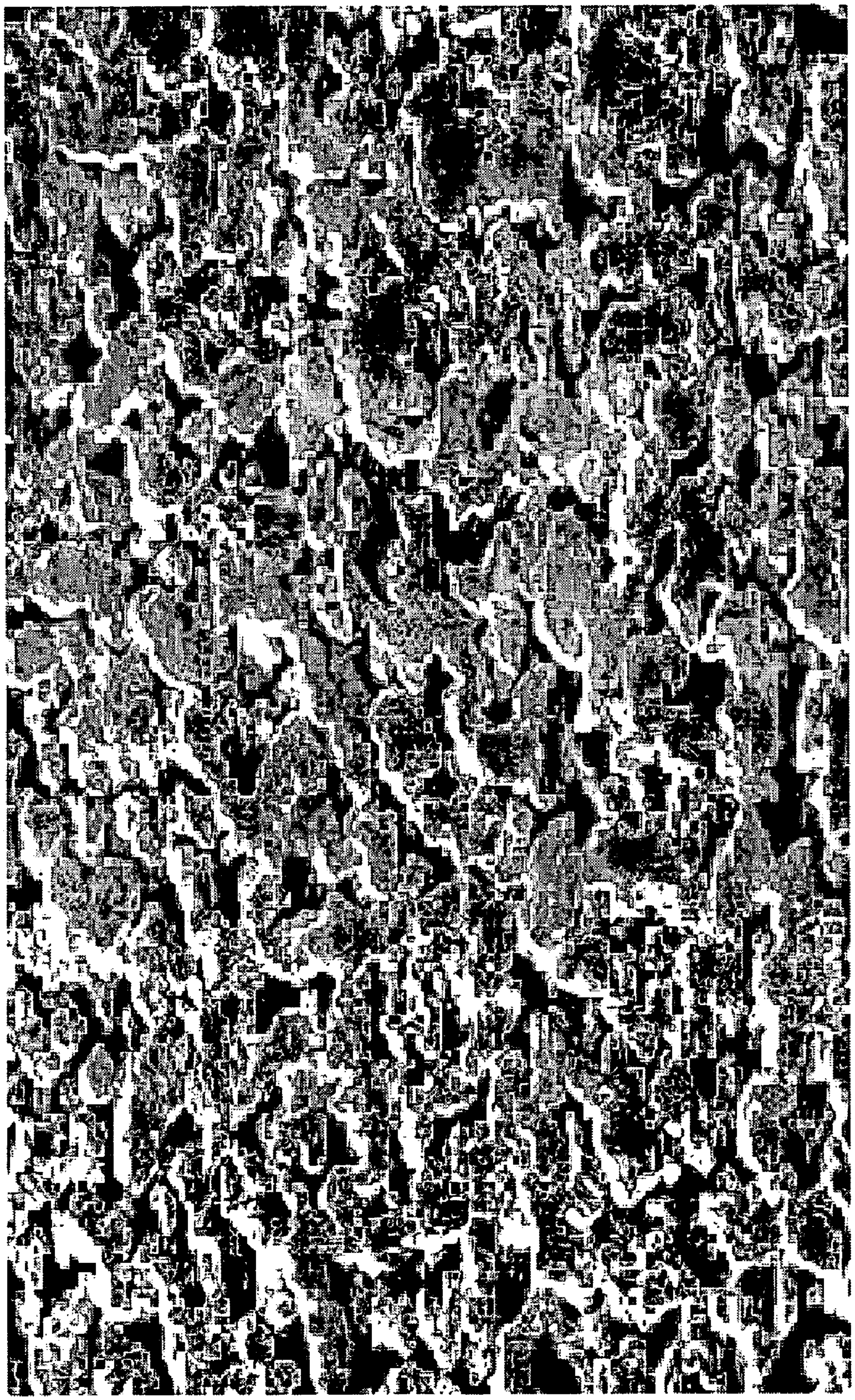
FIG. 6C is a pictorial illustration showing the porous body of an exemplary contactor and having exemplary pore shapes according to an embodiment of the invention.

FIG. 6C illustrates an embodiment of a porous body having exemplary pore shapes in an embodiment of the contactor. The pore shapes provide a large surface area to facilitate the mixing of the fluid and the liquid and transfer of a component therebetween. The pore shapes may not be consistent along an axial direction. In a particular embodiment, the pore shape changes continuously in the axial direction to cause a continuous change in the shape of the fluid and liquid traveling therethrough.

The fine porosity of the porous body 222 creates a pressure differential across the length of the porous medium and results in a highly sheared flow. In this environment, the high-shear mixing of the fuel and nitrogen allows transfer of the oxygen due to a differential in the oxygen partial pressure in the fuel versus the nitrogen. This concept is illustrated in FIGS. 7A-7C.

Figure 7B:
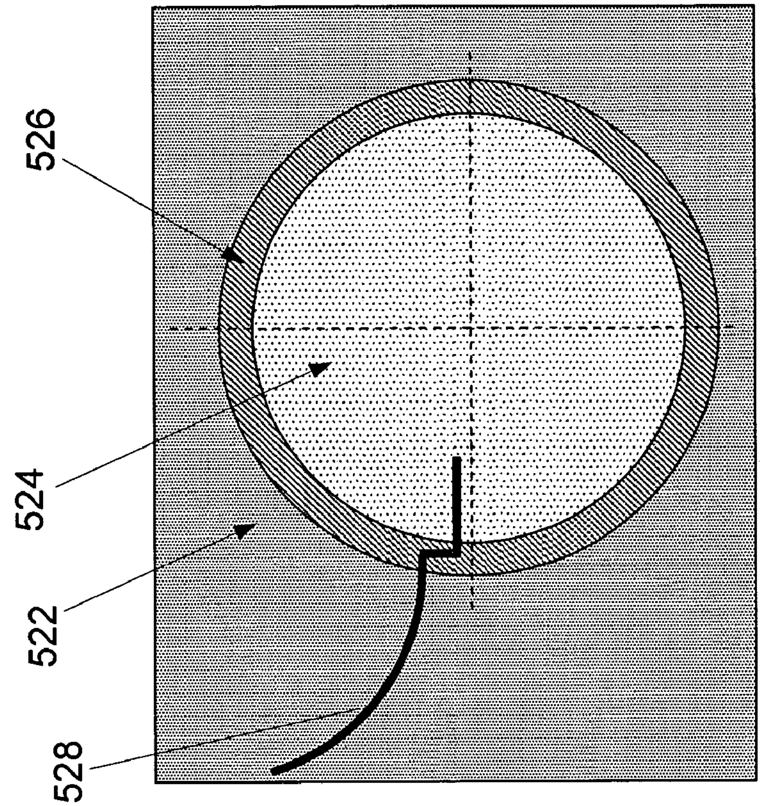
FIGS. 7A and 7B graphically illustrate the oxygen concentration in a fluid during mixing in prior art systems.
Figure 7A:
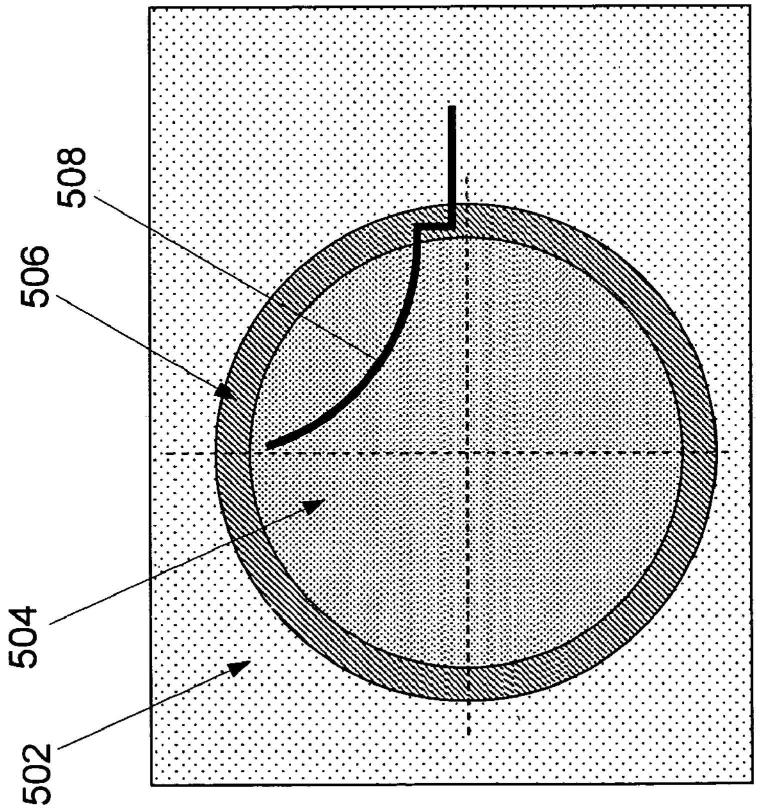

FIG. 7A illustrates the transfer of oxygen when a droplet of oxygenated fuel 504 is immersed in a large volume of nitrogen gas 502. Due to the differential in the oxygen partial pressure, oxygen is transferred from the fuel droplet 504 to the nitrogen gas 502. In this regard, a transfer region 506 forms on the outer surface of the fuel droplet 504. Due to the limited penetration of the transfer region 506, the concentration of oxygen in the central region of the fuel droplet 504 remains high, as indicated by the graph line 508. Graph line 508 represents the oxygen level (vertical axis) as a function of distance (horizontal axis) from the center of the droplet 504.

Similarly, FIG. 7B illustrates the transfer of oxygen when a nitrogen bubble 524 is positioned in a volume of liquid fuel 522. Again, a transfer region 526 forms on the outer surface of the nitrogen bubble 524, but the concentration of oxygen in the center of the bubble remains low, while the concentration of oxygen at a small distance from the bubble 524 remains high.

Figure 7C:
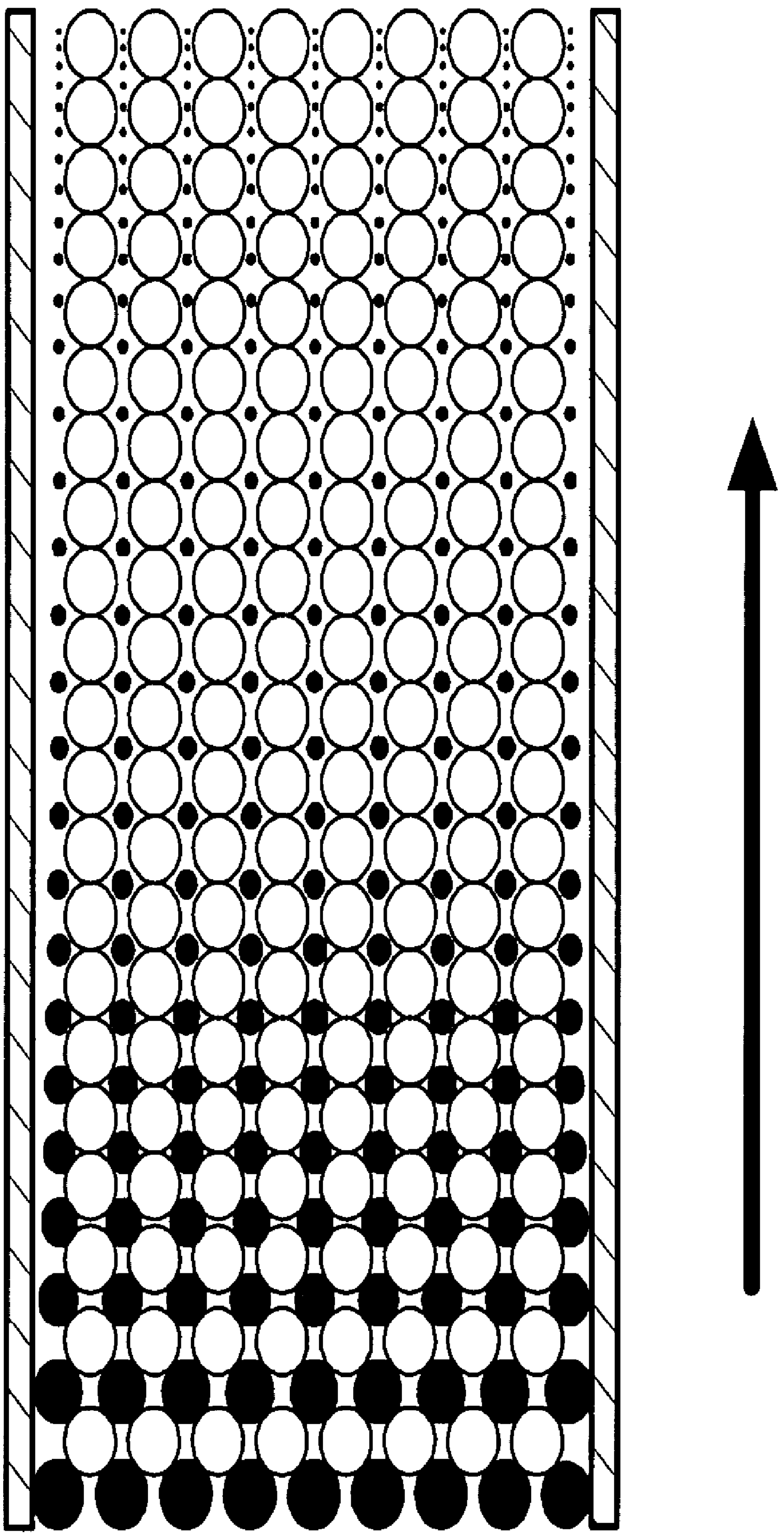
FIG. 7C graphically illustrates the mixing of a liquid and a fluid using a contactor according to an embodiment of the invention.

By contrast, as illustrated conceptually in FIG. 7C, the fine porosity of the porous body of the contactor 220 creates a fine mixture of the fuel and the nitrogen gas, resulting in greater transfer of oxygen. For purposes of clarity, the porous material is not shown in FIG. 7C. Instead, the movement of the fluid and the liquid through the porous material is illustrated. FIG. 7C illustrates the movement of the liquid and the fluid through the contactor in a direction indicated by the arrow. The liquid is indicated by dark circles, and the fluid is indicated by the white circles. As the liquid and the fluid move through the porous body, the liquid-fluid interface may be continuously broken and/or reshaped, thereby exposing more surface area for transfer of the component. As noted above, FIG. 7C illustrates the mixing only in a conceptual manner. It will be understood by those skilled in the art that the actual movement may be very different. For example, the size of the fluid may also change with the pore sizes and pore shapes.

Figure 8:
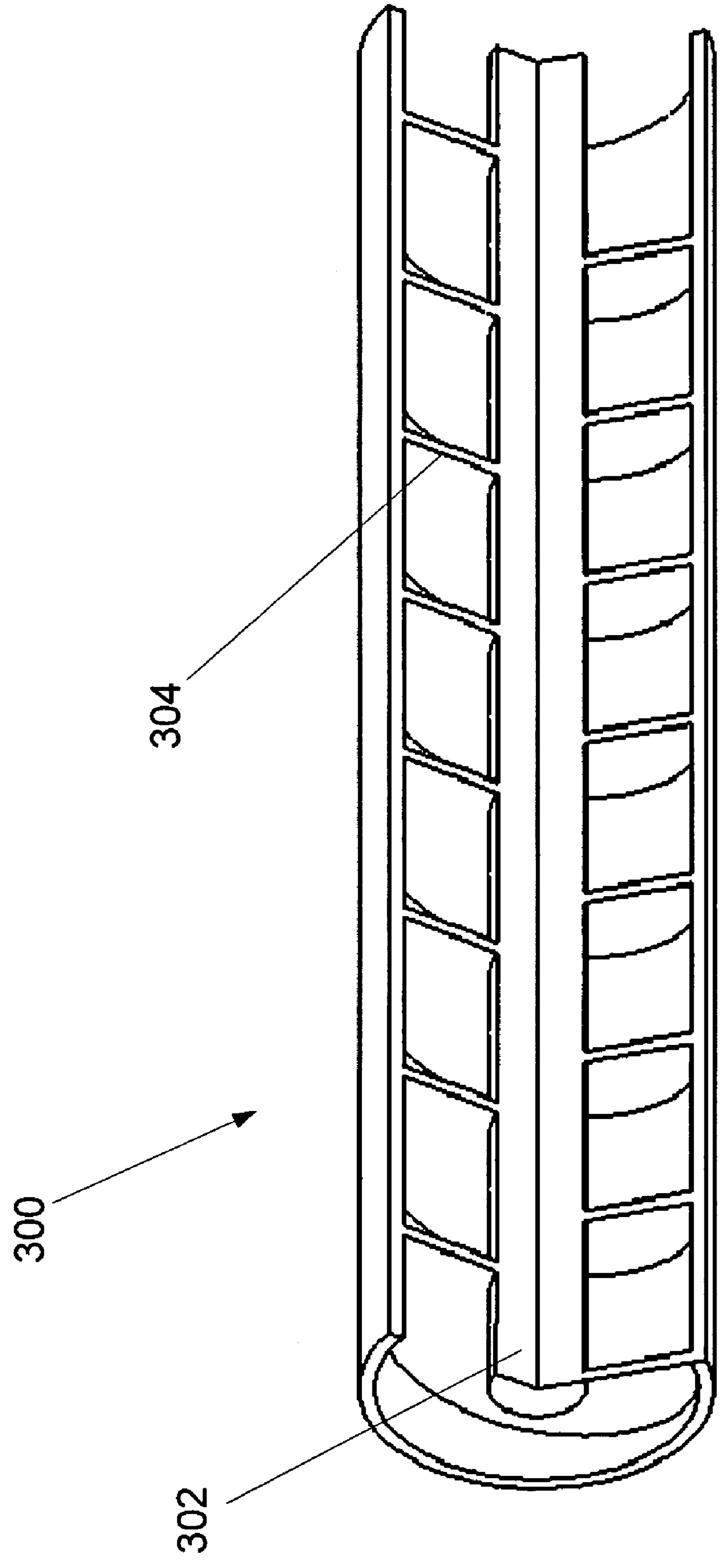
FIG. 8 is an illustration of an embodiment of a separator according to the invention.

FIG. 8 illustrates an embodiment of a separator 300 for separating the nitrogen gas and the liquid fuel after the transfer of oxygen from the fuel to the nitrogen. In the illustrated embodiment, the separator is a centrifugal separator. In this regard, the separator 300 is provided with a central shaft 302 having a spiral track 304. In operation, the shaft may rotate about a central axis, causing small nitrogen bubbles from the contactor to join, forming larger bubbles or separating altogether from the liquid fuel. In certain embodiments, the centrifugal separator 300 forms large bubbles mixed with the liquid fuel. This mixture is then sent to either another centrifugal separator for complete separation or to a mesh separator for separation of the large bubbles from the liquid.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A system for facilitating transfer of a component from a liquid phase to a fluid phase, said system comprising:

a contactor comprising a porous medium adapted to cause mixing of a liquid and a fluid, said liquid having a component therein, said contactor being further adapted to facilitate transfer of said component between said liquid and said fluid, a fluid purification module adapted to remove said component from said fluid when said transfer includes transferring component from said liquid to said fluid, wherein the fluid purification module is adapted to catalytically consume at least a portion of said component in said fluid, and a recirculation line adapted to transfer said fluid from said fluid purification module to said contactor.

2. The system of claim 1, wherein the porous medium includes pores having a pore size of less than 500 microns.

3. The system of claim 2, wherein the pore size is approximately 400 microns.

4. The system of claim 1, further comprising:

a pre-mixer adapted to provide a mixture of the fluid and the liquid to the porous medium.

5. The system of claim 4, wherein the pre-mixer includes:

a plurality of substantially axial channels for passing said liquid therethrough into a path directed toward the porous medium; and a porous body for diffusing said fluid into the path.

6. The system of claim 5, wherein the pre-mixer further comprises: an annular passage along a circumferential perimeter of the pre-mixer for receiving the fluid and directing the fluid to the porous body.

7. The system of claim 1, wherein the porous medium is made of an inert material.

8. The system of claim 1, wherein the liquid is a fuel and the component is a component gas.

9. The system of claim 8, wherein the fuel is at least one of diesel, kerosene, and jet fuel.

10. The system of claim 8, wherein the component gas is oxygen.

11. The system of claim 1, wherein the component is a component gas dissolved in said liquid prior to said mixing.

12. The system of claim 1, wherein the fluid is a gas.

13. The system of claim 12, wherein the gas is a non-reactive gas.

14. The system of claim 13, wherein the non-reactive gas is at least one of nitrogen, argon, helium and carbon dioxide.

* * * * *